United States Patent [19]

Dote et al.

[11] Patent Number: 5,213,335

[45] Date of Patent: May 25, 1993

[54] OPTICAL DEVICE AND BEAM GUN DEVICE USING THIS OPTICAL DEVICE

[75] Inventors: Shingo Dote, Kawasaki; Tatsuya Nishimura, Tokyo, both of Japan

[73] Assignee: Sega Enterprises, Ltd., Tokyo, Japan

[21] Appl. No.: 666,875

[22] Filed: Mar. 8, 1991

[30] Foreign Application Priority Data

Apr. 23, 1990 [JP] Japan .................... 2-107055
Jun. 11, 1990 [JP] Japan .................... 2-152310

[51] Int. Cl.⁵ ............................ A63F 9/22; A63F 9/24
[52] U.S. Cl. ................................. 273/313; 273/316; 434/21
[58] Field of Search ............... 273/310, 311, 312, 313, 273/314, 315, 316; 434/16, 17, 19, 20, 21, 26; 446/219, 401, 405, 473

[56] References Cited

U.S. PATENT DOCUMENTS

| | | | |
|---|---|---|---|
| 3,026,640 | 3/1962 | Ogdon | 446/473 |
| 3,635,477 | 1/1972 | Ochi | 273/316 |
| 3,782,728 | 1/1974 | Yasuda | 273/316 |
| 3,815,913 | 6/1974 | Wren et al. | 273/316 |
| 4,189,145 | 2/1980 | Stubben et al. | 273/313 |
| 4,268,036 | 5/1981 | Yokoi | 273/316 |
| 4,288,943 | 9/1981 | Ptaszek et al. | 273/316 |
| 4,439,156 | 3/1984 | Marshall et al. | 273/312 |
| 4,830,381 | 5/1989 | Sellner | 273/312 |
| 4,844,476 | 7/1989 | Becker | 273/313 |
| 4,917,609 | 4/1990 | Eichweber | 434/21 |

*Primary Examiner*—Jessica J. Harrison
*Attorney, Agent, or Firm*—Price, Gess & Ubell

[57] ABSTRACT

An optical assembly is provided to simulate the emission of a light beam such as a laser, so that it appears to extend a considerable distance from the observer. The optical device can be advantageously integrated with a video game system or a simulated gun, and includes an arrangement of reflecting and semitransparent mirrors that can define a field of view, for example, of a target area, and can superimpose images of a light emitting unit so that a light beam can apparently extend to a target while maintaining a compact configuration.

20 Claims, 9 Drawing Sheets

OPTICAL DEVICE AND BEAM GUN DEVICE USING THIS OPTICAL DEVICE

BACKGROUND OF THE INVENTION

1. Field of the Invention

The present invention relates to an optical device and a beam gun device, wherein one linear light source continuously appears as if a laser beam is emitted a considerable distance from an observer.

The present invention is also directed to an optical device and a beam gun device, wherein light sources which are sequentially consecutively flashed appear as if a laser beam is emitted a far distance.

2. Description of the Prior Art

A typical arrangement of a conventional imitation gun game machine employing an ordinary image is that the imitation gun provided in front of a TV screen shoots the image projected thereon. A bullet mark of the imitation gun is merely projected on the screen.

The following is a description of a method of bringing about a process to create an illusion that a laser beam, emitted from a muzzle of the imitation gun, reaches an object by giving a far-and-near effect to a light trajectory of the beam gun. FIG. 12 illustrates an imitation gun game machine. In the game machine 01, an eye position 03 of the player is spaced away from a monitor screen 04 in a box 02. Disposed in this space is a so-called laser beam unit 05 composed of a multiplicity of LEDS arranged in a V-shape in depth from bilateral directions of the player towards the front central part, i.e., the monitor screen, thus providing some distance. For a variety of targets projected on the monitor screen 04 through a half-mirror 06, the LEDs are lit up to a remote position sequentially from this side. This causes a far-and-near feeling in which the laser beam emitted immediately from both sides of the player, i.e., from the beam gun, reaches the remote target.

This method, however, needs a depth of field for the LEDs of sufficient distance to arrange the LEDs in a V-shape. If the V-shaped depth is too far from the image, a disadvantage is caused in terms of the far-and-near feeling. Hence, the application of this method is limited to an interior of the box. The arrangement that the V-shaped laser beam unit removed from the box is singularly attached to a beam gun unit is inconvenient in terms of designing the gun and its appearance.

SUMMARY OF THE INVENTION

It is a primary object of this invention, which obviates the forgoing problems, to provide an optical device and a beam gun device arranged to give a feeling that a beam emitted from a muzzle of a beam gun reaches a remote target without requiring considerable displacement distance for a laser beam unit.

It is another object of this invention to provide an optical device and a beam gun device arranged to give a feeling that the laser beam reaches a substantial distance by sequential flashing from adjacent the observer.

To accomplish the objects, according to one aspect of the invention, there is provided an optical device comprising: a flash light emitting means extending on a side surface between a half-mirror and a reflection mirror which are disposed in parallel to confront each other; and a second half-mirror obliquely provided in an optical rear position of the former half-mirror. The optical rear position does not, if via the reflection mirror, imply the rear in position. In this case, the second half-mirror exists at a reflecting destination of the reflection mirror. On the second half-mirror, a scene viewed via the second half-mirror is overlapped with a flash reflection image between the mirrors.

A beam gun device using this optical device according to this invention is constructed as follows. An imitation gun muzzle is provide in such a position that an initial end of the flash image reflected by the second half-mirror can be seen through the second half-mirror. The flash light emitting means extending between the mirrors are instantaneously flashed by operating an emitting means of the laser beam.

According to another aspect of the invention, there is provided an optical device comprising: flash light emitting means extending on a side surface between two half-mirrors disposed in parallel to confront each other, wherein an outside scene is seen through the two half-mirrors together with a flash image reflected between the half-mirrors. A beam gun device using this optical device according to the present invention includes flash light emitting means instantaneously flashed by operating an emitting means.

Based on the construction to reflect flashing between the reflection mirror and the half-mirror, when seeing the scene via the second half-mirror, flashing happens between the mirrors by pushing an emission trigger. Flashing is reflected between the mirrors. The flash images sequentially appearing from the first half-mirror continue infinitely far and are overlapped with the scene viewed through the second half-mirror.

On the basis of the structure to reflect flashing between the two half-mirrors in accordance with the present invention, both the scene viewed through the second half-mirror and the flash images reflected between the half-mirrors by pushing the emission trigger continue far and are overlapped with the outside scene.

In accordance with the present invention, there is employed a condensing means, including a convex lens, a convex Fresnel lens and a concave lens, for condensing beams of light at one point which emerge is parallel. There is also provided a display means such as a CRT and a light source for generating a flash on a plane including an optical axis of the condensing means within an optical focal distance of the condensing means even through a reflection mirror.

According to still another aspect of the invention, there is provided an optical device arranged such that as enlarge virtual image associated with the light coming from the display means is obtained by the condensing means and led to an optical synthesizing means such as a half-mirror and a glass. The optical synthesizing means synthesizes a remote scene with the enlarged virtual image. A beam gun device using this optical device according to the present invention is arranged as follows. The muzzle of the imitation gun is set in a position of an initial end of the enlarged virtual image synthesized with the remote scene by the optical synthesizing means. Flashes of the display means are given forth sequentially from this side by operating the emitting means such as an emission trigger.

In accordance with this invention, the images flashed on a luminous surface sequentially from this side are enlarged as enlarged flash virtual images by the condensing means. The enlarged virtual images appear as if the flashes are given forth from the muzzle of the imitation gun by synthesizing the remote scene with the enlarged flash virtual images by the optical synthesizing means such as a half-mirror.

BRIEF DESCRIPTION OF THE DRAWINGS

Other objects and advantages of the invention will become apparent during the following discussion taken in conjunction with the accompanying drawings: in which.

DETAILED DESCRIPTION OF THE PREFERRED EMBODIMENT:

The present invention will be described by way of an embodiment with reference to the accompanying drawings.

Figure 1:
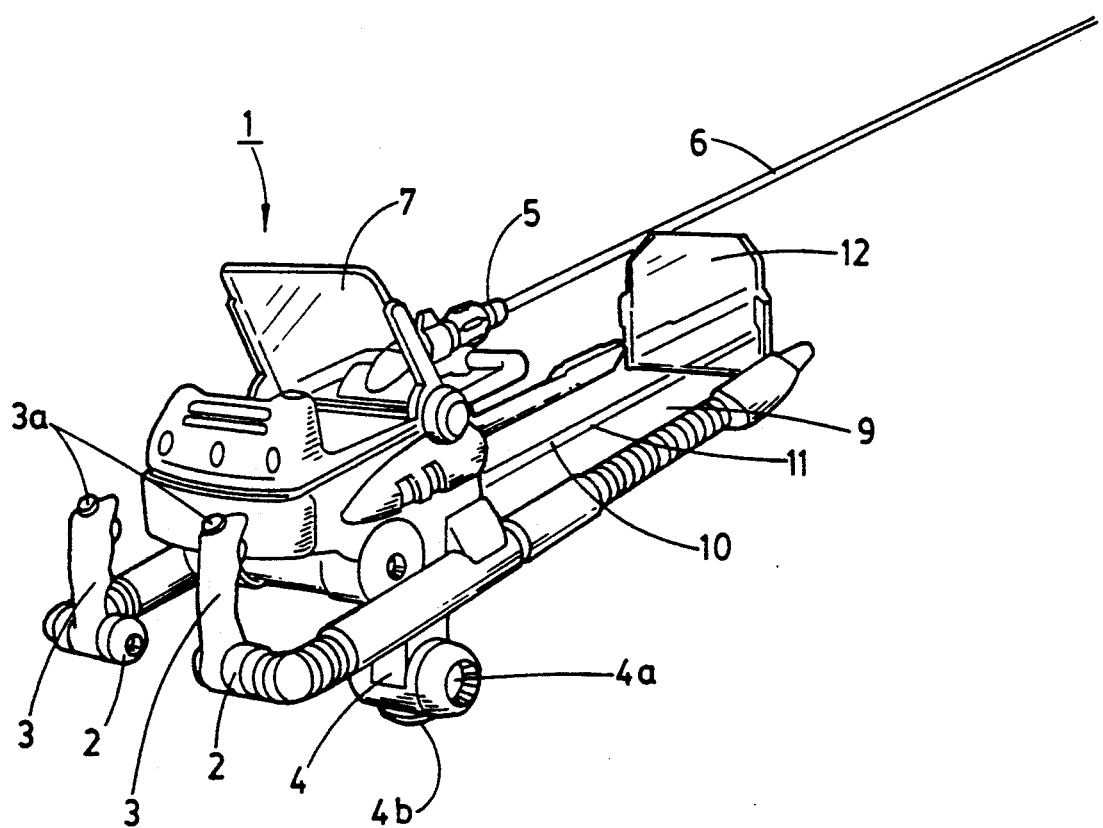
FIG. 1 is a sketch drawing illustrating a beam gun device of this invention.

FIG. 1 is a sketch drawing depicting a beam gun of a simulation laser according to the present invention. The beam gun 1 includes operation handles 2 provided on this side. Grips 3 are formed at the handles 2. The grips 3 are obliquely movable to and fro or right and left by a support member 4 provided at the bottom. Emission triggers 3a are depressed while taking aim at a target. A simulation laser beam 6 is emitted from a muzzle 5. Simultaneously, a firing sound can be made from an unillustrated speaker.

A shooter sets the muzzle 5 at the target through a half-mirror 7 serving as both a windshield and a sight. The simulation laser beam 6 is emitted by depressing the emission triggers 3a.

Figure 2:
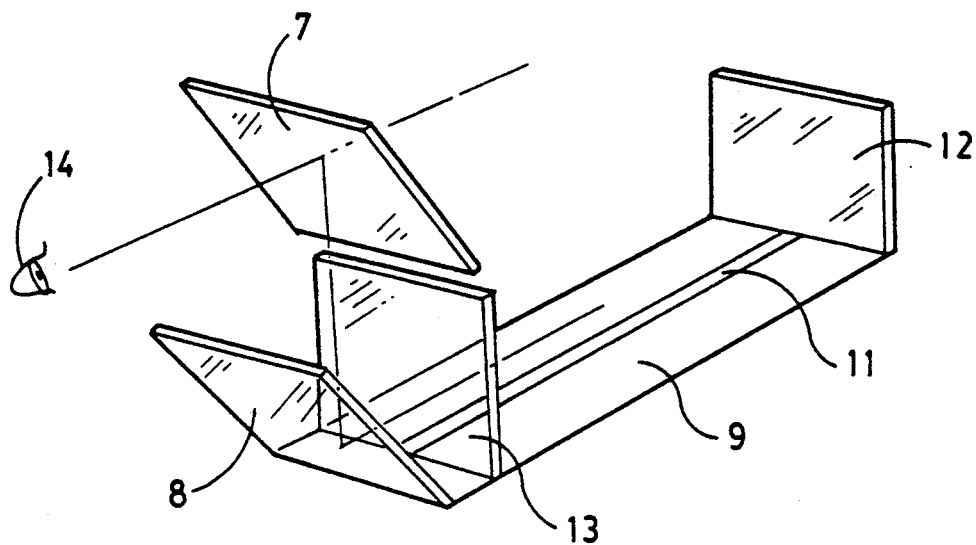
FIG. 2 is a principle view showing the beam gun device of FIG. 1.

The following is a description of a construction of the simulation laser beam gun 1. As illustrated in FIG. 2, the half-mirror 7 imitating the windshield is fitted obliquely downwards on this side of the muzzle 5. The semitransparent or half-mirror 7 defines a field of view for the observer. A rectangular reflection mirror 8 is disposed downwardly of the half-mirror in parallel therewith. An edge of the reflection mirror 8 is attached to a mid-bottom surface 9 of the simulation laser beam gun 1 so that a specular face thereof is directed upwards.

The half-mirror employed herein is manufactured by effecting a vacuum vapor-deposition of chrome on a glass surface or an acrylic plate. The half-mirror performs functions to reflect the incident light on the specular face and to transmit the light directly. If a small reflectance may suffice, a transmittable glass or a transmittable acrylic plate may be satisfactory as a quite simple one.

Formed in the mid-bottom surface 9 in front and just under the muzzle 5 is a slit 10 extending in parallel along a line of extension of the simulation laser beam 6 emitted from the muzzle 5. A linear light emitting body 11 serving as a light source is set in the slit 10 so that the upper face of the light emitting body 11 is flush with the upper face of the mid-bottom surface 9.

A rectangular reflection mirror 12 stands erect on the mid-bottom surface 9 in the vicinity of the front end of the light emitting body 11. Its specular face orthogonal to the light emitting body 11 is directed on this side. A half-mirror 13 assuming the same configuration as the reflection mirror 12 stands erect on the mid-bottom surface 9 in the vicinity of the end of the light emitting body 11 on this side. The half-mirror 13 is disposed in parallel with the mirror 12 in front and downwardly of the half-mirror 7. The reflection mirror 12 and the half-mirror 13 are disposed on the end face of the light emitting body 11. Upper edges of the mirrors 12 and 13 are set under the simulation laser beam 6.

The support member 4 for the beam gun 1 is, as depicted in FIG. 1, provided at the bottom thereof. On the upper side, the support member 4 is axially supported on a horizontal shaft 4a so that the beam gun 1 is shiftable back and forth or right and left. On the lower side, the support member 4 is rotatably axially supported on a vertical shaft 4b. The horizontal and vertical shafts 4a and 4b are arranged to rotate, though not illustrated, a rotary shaft of an angle reader such as a rheostat (not shown). With this arrangement, a deflection angle of the simulation laser beam gun 1 is electrically detectable.

The simulation laser beam gun 1 of the invention will be explained referring to a principle view of FIG. 2. The light emitting body 11 defined as the linear light source is set in the slit 10 formed in the mid-bottom surface 9. The reflection mirror 12 and the half-mirror 13 parallel therewith are so located at both ends of the light emitting body 11 as to be orthogonal to the body 11. The reflection mirror 8 is disposed in rear of the half-mirror 13 so that the mirror 8 is inclined on this side. Upwardly of the reflection mirror 8, the half-mirror 7 is positioned in parallel therewith.

With the arrangement of a group of these mirrors, a reflection optical system consisting of the reflection mirror 12 and the half-mirror 13 infinitely reflect an image of the slit 10. In fact, however, the half-mirror 13 transmits some of the light, whereby an attenuation takes place at every reflection. This situation is shown in FIG. 3 when viewing the light emerging from this side of the half-mirror 13.

Figure 3:
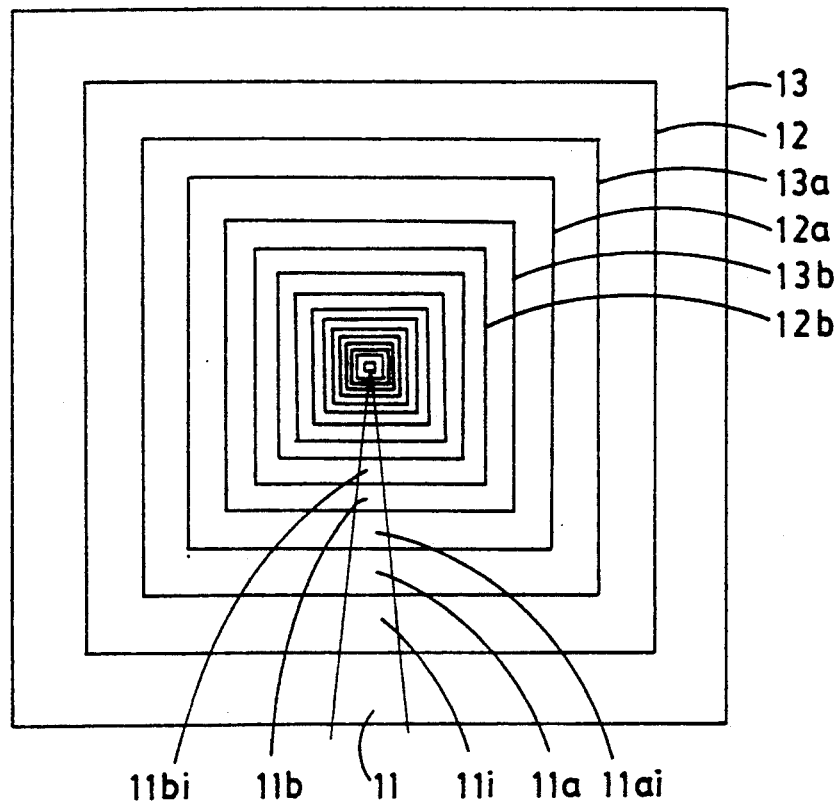
FIG. 3 is a diagram showing a reflection state between a half-mirror and a reflection mirror when viewed from an exterior of the half-mirror.

Referring to FIG. 3, the outermost rectangle indicates a prototype of the half-mirror 13. The rectangle next thereto is a prototype of the reflection mirror 12 viewed via the half-mirror 13. A prototype of the light emitting body 11 incorporated into the slit 10 can be seen between the half-mirror 13 and the reflection mirror 12. The rectangle inside the reflection mirror 12 is a virtual image 13a of the half-mirror 13 which is reflected by the reflection mirror 12. The symbol 11i designates a virtual image, seen therebetween, of the light emitting body 11 which is reflected by the reflection mirror 12.

The rectangle inside the virtual image 13a of the half-mirror 13 indicates a virtual image 12a formed when the reflection mirror 12 reflects the light reflected from the half-mirror 13 among the light beams of the half mirror 12 which are partly reflected by and partly penetrate the half mirror 13. The light of the light emitting body is partly reflected by the half-mirror 13 and partly penetrates the mirror 13. This reflected light is further reflected by the reflection mirror 12 and then penetrates the half-mirror 13, thus forming a virtual image 11a of the light emitting body 11 therebetween.

The rectangle inside the virtual image 12a is a virtual image 13b of the half mirror 13. The half-mirror 13 is reflected by the reflection mirror 12. Of the beams of light which are partly reflected by and partly penetrate the half-mirror 13, the reflected light is again reflected from the reflection mirror 12 and then penetrates the half mirror 13, thus forming the virtual image 13b. The light of the light emitting body 11 is reflected by the reflection mirror 12. The reflected light is partly reflected by and partly penetrates the half-mirror 13. This reflected light thereof is again reflected by the reflection mirror 12 and then penetrates the half-mirror 13, thus forming a virtual image 11ai of the light emitting body 11.

Similarly, virtual images 12b, 13b, . . . are infinitely formed inwardly of the virtual image 13a. Virtual images 11b, 11bi, . . . of the light emitting body 11 are successively formed.

Brightness of light will be examined with reference to FIG. 3. The brightness of the light emitting body has the following magnitudes. The brightness of the light emitting body 11 is the same as that of the virtual image 11i thereof. The virtual images 11a and 11ai of the light emitting body 11, which are slightly darker, have the same brightness. The virtual images 11b and 11bi of the light emitting body 11, which are still darker, have the same brightness. The brightness is thus gradually decreased.

The ambiences of a group of mirrors are darkened to make the mirror images inconspicuous. Whereas only the light emitting body is made luminous. The arrangement is that an observer sees the enhanced light emitting body.

Based on the discussion given above, a further description will be made referring back to the principle view of FIG. 2. The image of the light emitting body 11 is, as depicted in FIG. 3, seen via the half-mirror 13. This image is reflected by the reflection mirror 8 disposed on this side of the half-mirror 13. The image is further reflected by the half-mirror 7 and incident on an eye 14 of the observer positioned on this side of the half-mirror 7.

The observer sees the light emitting body 11 as if it is located in front of the half-mirror 7. A group of virtual images of the light emitting body look as if they are disposed on the line of extension thereof.

The half-mirror 7 transmits the light emerging from the forward direction. Hence, the half-mirror 7 synthesizes the background light existing forwards with the group of images, illustrated in FIG. 3, of the light emitting body 11. The synthesized light and images are incident on the eye 14 of the observer.

The beam gun 1 depicted in FIG. 1 incorporates the group of mirrors, and hence a position of the eye of the shooter is at the same level as that of the eye 14 of the observer. The shooter can see as if the light is emitted from the muzzle 5 provided just in such a position that the images of the light emitting body are visible.

Besides, as illustrated in FIG. 3, this light looks narrower as it moves forward. The light is gradually darkened to cause an illusion that the light emitted from the muzzle 5 travels forward until it is apparently lost from sight at an extreme distance.

In the description given above, the light emitting body assumes a slit-like configuration orthogonal to the mirror face. The light emitting body may substantially be inclined. In this case, the simulation laser beam is emitted zigzag.

The entire mid-bottom surface 9 serves as an image display plane of a liquid crystal monitor or a CRT, whereby a shape of the simulation laser beam can arbitrarily be changed. Oblique linear luminescence can give a laser beam like a flash of lightning. An applicable range is thus widened.

If an image display unit is used on the mid-bottom surface 9, a direction of the beam gun 1 is detectable by a computer when, e.g., emitting the laser beam. Hence, only when being in a horizontal position, the ground of a uniform pattern is displayed together with the laser beam. It is possible for the laser beam to appear as if a flash of the laser beam runs on the ground surface.

Similarly, for instance, the light emitting body and the image display unit are disposed above the mid-bottom surface. This arrangement makes it possible to create an image effect wherein an infinite number of stars appear.

Figure 4:
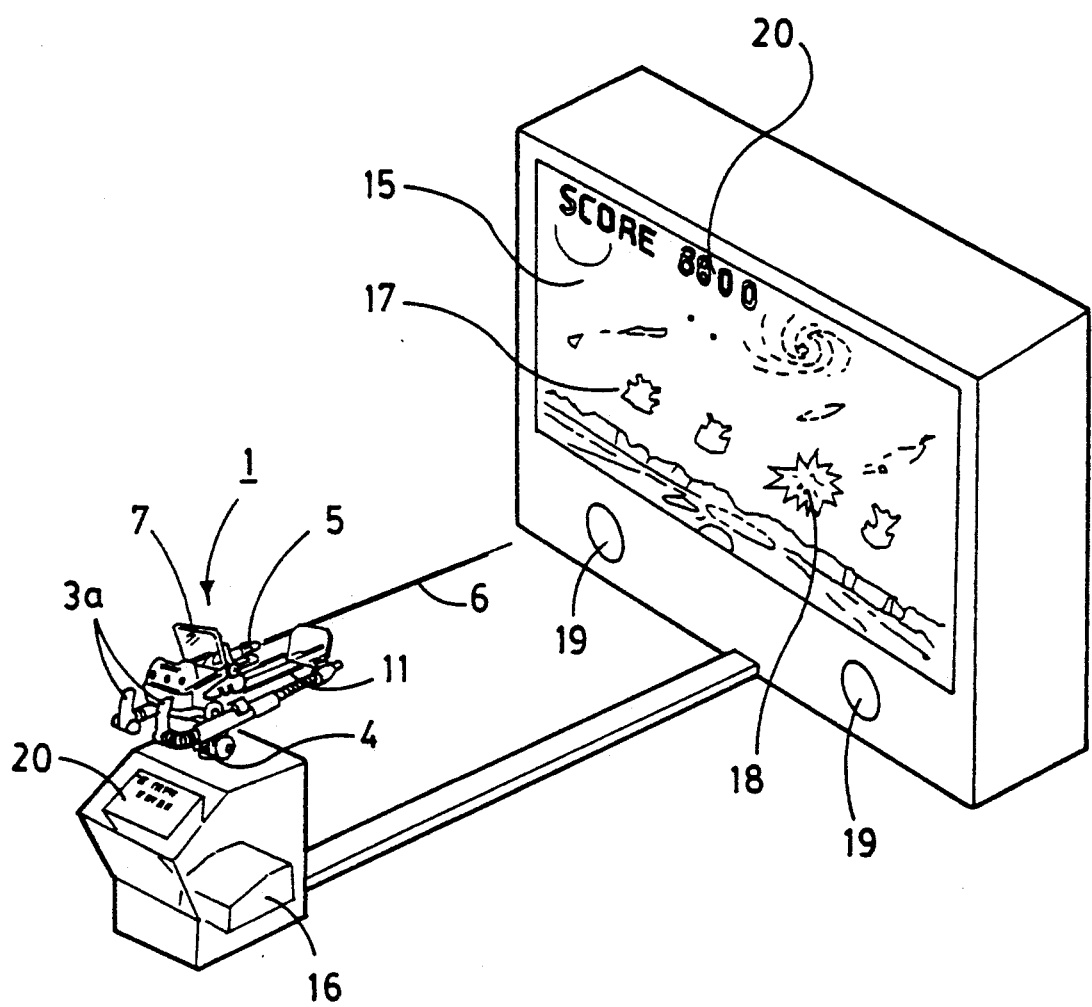
FIG. 4 is a view showing an embodiment of a simulation laser beam gun game machine according to the present invention.

As illustrate in FIG. 4, a projector 16 projects a target 17 on a screen 15 disposed at a forward position. The shooter aims the muzzle 5 of the beam gun 1 at the target 17 and depresses the emission triggers 3a of the grips 3. At this time, an unillustrated instantaneous lighting circuit for the light emitting body 11 is closed. The light emitting body 11 is thereby supplied with electric power from the same circuit. The light emitting body 11 emits the light, the instant the emission triggers 3a are depressed.

The shooter, who is watching the image projected on the screen 15 via the half-mirror 7, sees the simulation laser beam 6 as if the beam 6 is emitted from the beam gun 1 towards the target 17.

The unillustrated computer detects a direction of the beam gun 1 and a position of the target 17 in the image projected on the screen 15.

The computer controls movements of the target 17 in the image. The movements of the target 17 are stored in a memory of the computer. The direction of the beam gun 1 are electrically detected by a detector (not shown) such as a rheostat for detecting movements of the horizontal shaft 4a and the vertical shaft 4b of the support member 4. The direction of the muzzle 5 and the position of the target 17 are checked in realtime within the computer. Simultaneously when depressing the emission triggers 3a, and if the direction of the muzzle 5 coincides with the position of the target 17, any kind of action image 18 such as an exploded image of the target 17 is projected. Simultaneously, the speaker 19 makes an exploding sound. The computer counts a predetermined score. The score is displayed on a score display unit 20 such as a CRT which is provided in the beam gun 1.

Figure 5:
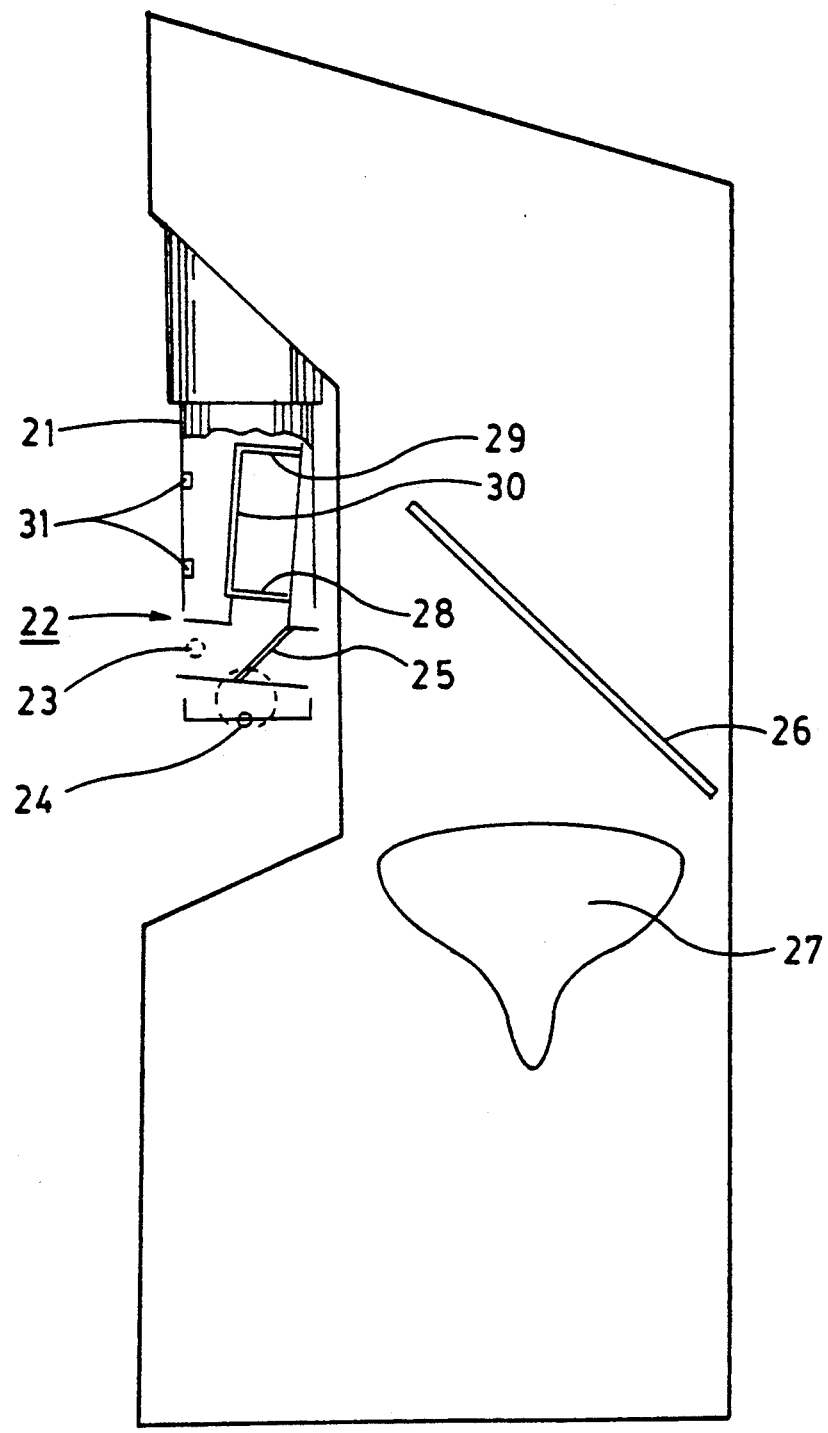
FIG. 5 is a view showing an embodiment of a vertical type TV game machine for a commercial purpose, in which an operation unit is a periscope of a submarine.

The embodiment discussed above has dealt with an arrangement of a group of four mirrors. FIG. 5 is a sectional view depicting a vertical type TV game machine for a commercial purpose in another embodiment. A group of mirrors of the beam gun 1 are arranged as follows. The mirrors are incorporated into an upper cylinder 21 as in a periscope of a submarine. In this case, an optical device 22 of a simulation laser assuming an inverted-T shape is constructed in the following manner. At the lower part of the cylinder 21, a rotary shaft 23 is so set in the cylinder 21 as to be attached to two side faces thereof on the view side. A gear (not illustrated) is secured to the rotary shaft 23. A handle 24 laterally fitted to a the side face of the cylinder 21 is turned. As a result, the gear of the rotary shaft 23 is rotated with rotations of a gear secured to the handle shaft through a gear train (not illustrated). The optical device 22 can be thereby tilted to and fro. The cylinder 21 is rotated by shifting the handle 24 right and left.

In the optical device 22, a half-mirror 25 is obliquely fitted to an inverted-T-shaped root portion, whereby it is possible to see a TV monitor 27 reflected by a reflection mirror 26 disposed in an interior of the vertical type TV game machine.

A half-mirror 28 is located upwardly of the half-mirror 25. A reflection mirror 29 is positioned above the mirror 28. A slit 30 extends on this side of the half-mirror 28 and the reflection mirror 29. The slit 30 is covered with a transmittable resin of a red or orange color. Spotlights or light emitting bodies 31 are fitted to the side face of the cylinder 21 on this side. The light emitting bodies 31 instantaneously become luminous by depressing unillustrated emission triggers. Every part of the slit 30 can be illuminated with the light. The light penetrating the transmittable resin is reflected between the half-mirror 28 and the reflection mirror 29 and becomes a simulation laser beam (not shown).

In this manner, the group of mirrors are accommodated in the cylinder 21 of the optical device of the simulation laser beam. The same effects as the above-described ones are obtained by the 3-mirror structure.

Figure 6:
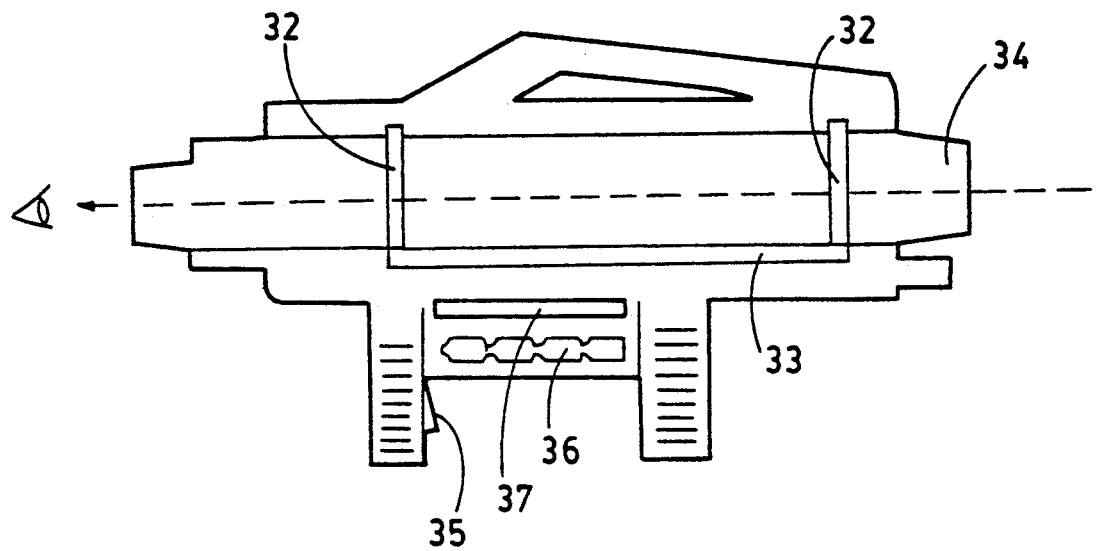
FIG. 6 is a side elevation showing an embodiment in which the present invention is applied to a bazooka beam gun toy.

FIG. 6 is a side elevation of a laser beam gun toy of a bazooka type, showing still another embodiment. The laser gun toy is arranged as follows. A gun barrel incorporates two half-mirrors 32 disposed in parallel to confront each other. A light emitting body 33 serving as a linear light source extends along the lower surface between the half-mirrors 32. The shooter peers into the gun barrel and sees through the two half-mirrors 32. The shooter aims a muzzle 34 at the target and then depresses an emission trigger 35. A battery 36 supplies the electric power to a light emitting body instantaneous lighting/firing sound generating circuit 37, thereby emitting the simulation laser beam. This toy is thus constructed.

In this case, the shooter is able to see the outside scene through the two half-mirrors 32. The linear light emitting body 33 forms a multiplicity of virtual images by the reflective action of the half-mirrors 32. A reflective state of the light flux will be explained. As compared with a case where the light source image is reflected by the half-mirror and the reflection mirror, the light flux passes in two directions and is then attenuated. Therefore, the light appears to be dark to the eyes of the shooter but is sufficiently usable.

Figure 7:
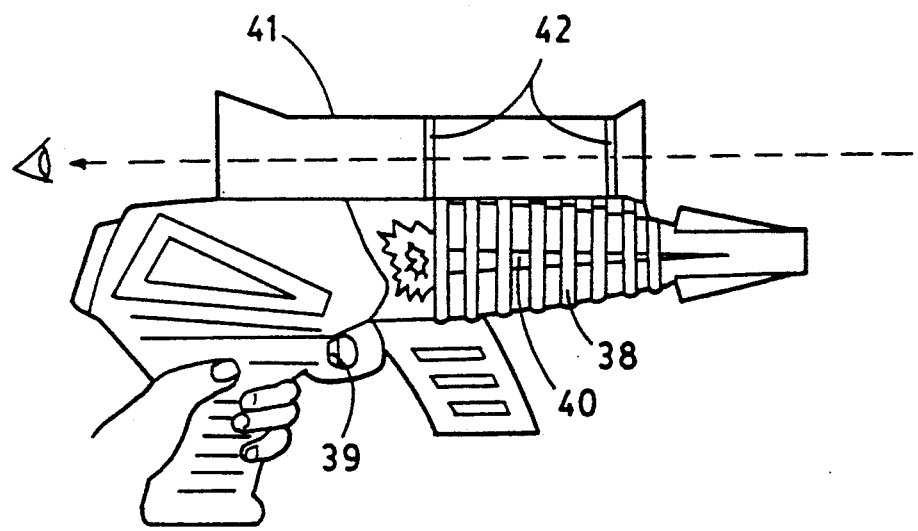
FIG. 7 is a side elevation showing an embodiment in which the present invention is applied to a laser beam gun toy.

Turning to FIG. 7, there is shown another embodiment of the laser beam gun toy.

In this embodiment, the gun toy includes a gun unit 38 made of a transport plastic resin which extends from the center thereof to the top end thereof. When pushing an emission trigger 39, a light emitting body 40 flashes within from the center thereof to the top end thereof.

Disposed upwardly of the gun unit 38 is a scope 41 incorporating two half-mirrors 42 disposed in parallel to confront each other. The lower part of the scope 41 is transmittable. In particular, a portion between the half-mirrors 42 is closely fitted to the gun unit.

Based on this structure of the scope 41, when the shooter pushes the trigger 39 while peering into the scope 41, the simulation laser beam flashes inside the gun unit 38. Flashing of the light emitting body 40 is led to the portion between the half-mirrors 42 of the scope 41 and reflected therefrom, the portion being closely fitted to the gun unit 38. The laser beam looks as if it is emitted behind the scene viewed via the scope 41. A person, who is watching the beam gun toy from outside, is able to visually recognize firing of the beam gun toy because of flashing of the gun unit 38.

As discussed above, the present invention exhibits the following advantages. The optical device of the invention gives such an illusion that the simulation laser beam emitted immediately from the shooter gives the appearance of traveling a significant distance. The simulation laser beam does not require an actual remote distance. Besides, a far-and-near feeling is given, because the laser beam appears to be darker with a remoter distance. An actual laser beam is not used, and hence a safety simulation laser beam gun can be provided.

Figure 8:
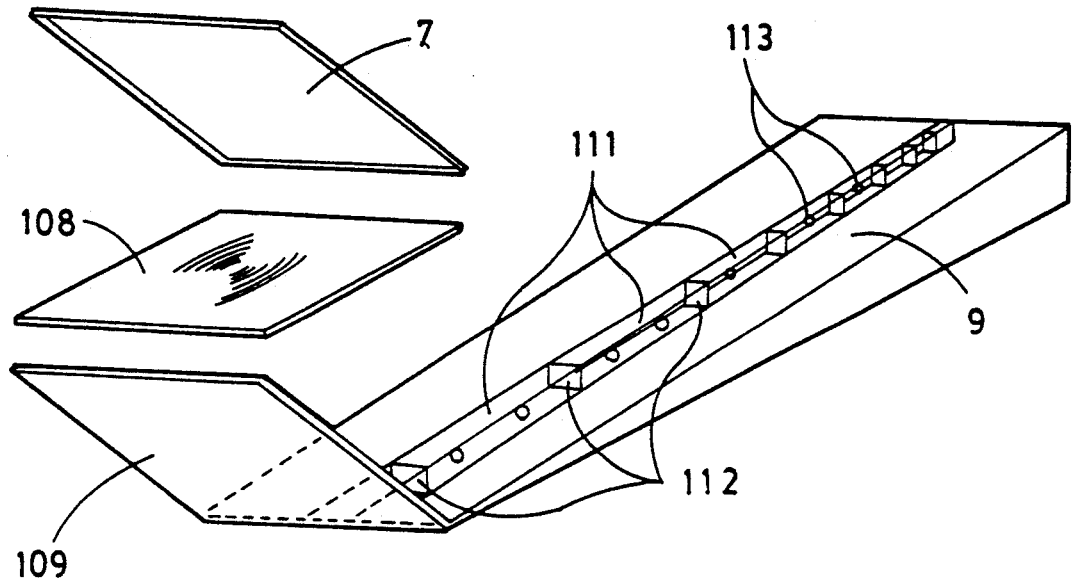
FIG. 8 is a perspective view illustrating an optical system of the beam gun in another embodiment.

FIG. 8 is a principal view showing an embodiment of a second beam gun of this invention. The principle view of FIG. 8 corresponds to the principle view of FIG. 2. A sketch drawing corresponding to FIG. 1 is substantially the same and is therefore omitted herein. Hence, a description of FIG. 8 will be made referring to FIG. 1.

A structure of the second beam gun will be explained. The half-mirror 7 imitating a windshield is attached obliquely downwards on this side of the muzzle 5 of FIG. 1. A rectangular convex Fresnel lens 108 is horizontally fitted under the half-mirror 7. A reflection mirror 109 is disposed substantially in parallel with the half-mirror 7 under the lens 108 so that a specular face thereof is directed upwards. An edge of the reflection mirror 109 is fitted to the mid-bottom surface 9 of the beam gun.

As the convex Fresnel lens 108, a convex lens is usable. Even if the convex Fresnel lens 108 or the convex lens is not employed, the same effects can obviously be obtained by using a concave mirror replaced with the reflection mirror 109.

Formed on the mid-bottom surface 9 in front and just under the muzzle 5 of FIG. 1 along the line of extension of the simulation laser beam 6 emerging from the muzzle 5 is a luminous surface 111 composed of a transmittable resin to assume an elongate isosceles triangular frustum having a base positioned on this side and a tapered end.

The luminous surface 111 assumes an orange or red color. The lower portion of the luminous surface 111 is sectioned by a group of wall faces 112 parallel with the reflection mirror 109. The group of wall faces 112 becomes denser the farther the distance from the reflection mirror 109. Each of the spaces separated from each other by the wall faces 112 accommodates a light emitting body 113 such as an LED lamp or a fluorescent lamp directed to the luminous surface 111. A plurality of light emitting bodies 113 are provided in portions which have a larger area of irradiation and are located closer to the half-mirror 109. With this arrangement, it is possible to make uniform illuminance intensities of the luminous faces of the wall faces 112 surrounding the light emitting body 113 concerned.

Figure 9:
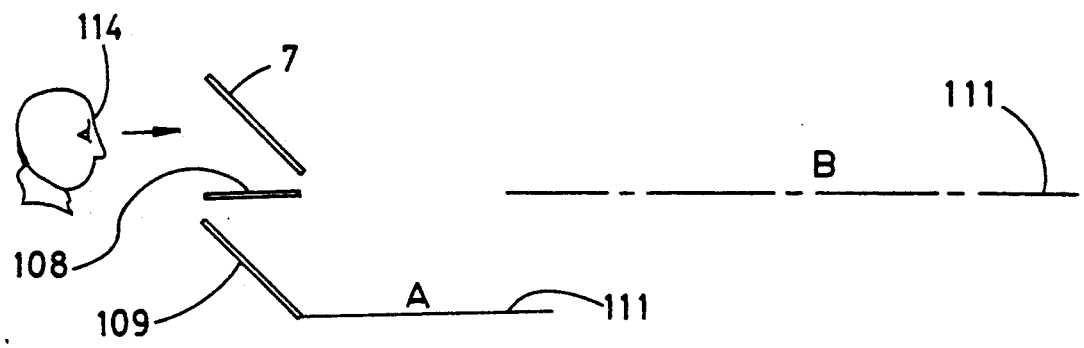
FIG. 9 is a side elevation showing a relationship between real and virtual images on a luminous surface in the beam gun device of FIG. 8.

FIG. 9 is a side elevation showing a relationship between real and virtual images of the luminous surface 111 in the beam gun of FIG. 8. When viewed from a visual point 114 of the observer positioned on this side of half-mirror 7, an image A of the luminous surface 111 on the mid-bottom surface 9 is reflected by the reflection mirror 109. The image appears to be reflected by the half-mirror 7 via the convex Fresnel Lens 108. A virtual image B thereof appears to be enlarged in front of the half-mirror 7.

Emission triggers 3a of the grips 3, depicted in FIG. 1, of the second simulation laser beam gun are depressed. With a firing sound, the light emitting bodies 113 are flashed sequentially from the one sectioned by the wall face 112 positioned on this side of the convex Fresnel lens 108 by means of an unillustrated lighting circuit. Flashing appears as if the beam is emitted from the muzzle 5.

The operation associated with FIG. 9 will be explained on the basis of the principle given above. When viewed from the visual point 114 of the observer positioned on this side of the half-mirror 7, the light reflected from the half-mirror 7 can be seen via the convex Fresnel lens 108 by enlarging the light coming from the luminous surface 111 through the reflection mirror 109.

At the half-mirror 7, the virtual image B of the luminous surface 111 which passes through the convex Fresnel lens 108 is synthesized with the light penetrating the half mirror 7. The virtual image B of the end of the luminous surface 111 on this side is provided from the top end of the muzzle 5 so that the laser beam emitted from the muzzle 5 goes forward.

The simulation laser beam gun depicted in FIG. 1 incorporates the group of mirror of FIG. 8. The eyes of the shooter are at the same level as the eyes 114 of the observer. The shooter is able to see the enlarged virtual image B of the luminous surface 111 just as the laser beam 6 which is being emitted from the muzzle 5.

The virtual image B of this light appears to be narrower as it travels, thereby bringing about an illusion that the light emitted from the muzzle 5 goes far.

In the description given above, the virtual image B of the luminous surface 111 is rectilinearly set but may be disposed zigzag. In this case, the laser beam is emitted zigzag.

When the luminous surface 111 is arranged to be an image display plane of a liquid crystal monitor or a CRT, a configuration of the laser beam 6 can arbitrarily be varied. For instance, a flash of linear lightning can provide a lightning laser beam. If a trajectory of a bullet is projected, it appears as if the bullet is shot. The applicable range is thus widened.

The image display unit is provided on the mid-bottom surface 9. In this case, for example, when emitting the laser beam 6, the computer detects a direction of the gun. Therefore, if the ground of a uniform pattern is displayed together with the laser beam 6 only when being in a horizontal position, it is possible to give a feeling in which flashing of the laser beam 6 highlights the ground.

Similarly, the light emitting body and the image display unit are disposed on a side or upper face of the reflection mirror 109. This arrangement makes it feasible to produce an image effect wherein an infinite number of stars appear.

As discussed with reference to FIG. 4, the projector 16 projects the target 17 on the screen 15 located forward in FIG. 4. The shooter aims the muzzle 5 at the target 17 and pushes the emission trigger 3a of the grip 3. An unillustrated lighting circuit for the light emitting bodies 113 is subsequently closed to thereby supply the electric power to the light emitting bodies 113. The moment the trigger 3a is pushed, the light emitting bodies 113 are sequentially flashed to make the luminous surface 111 luminous.

In consequence, the shooter, who is watching the image projected on the screen 15 through the half-mirror 7, sees the laser beam 6 as if the beam 6 shot from the simulation laser beam gun goes towards the target 17 when pushing the emission trigger 3a.

Figure 10:
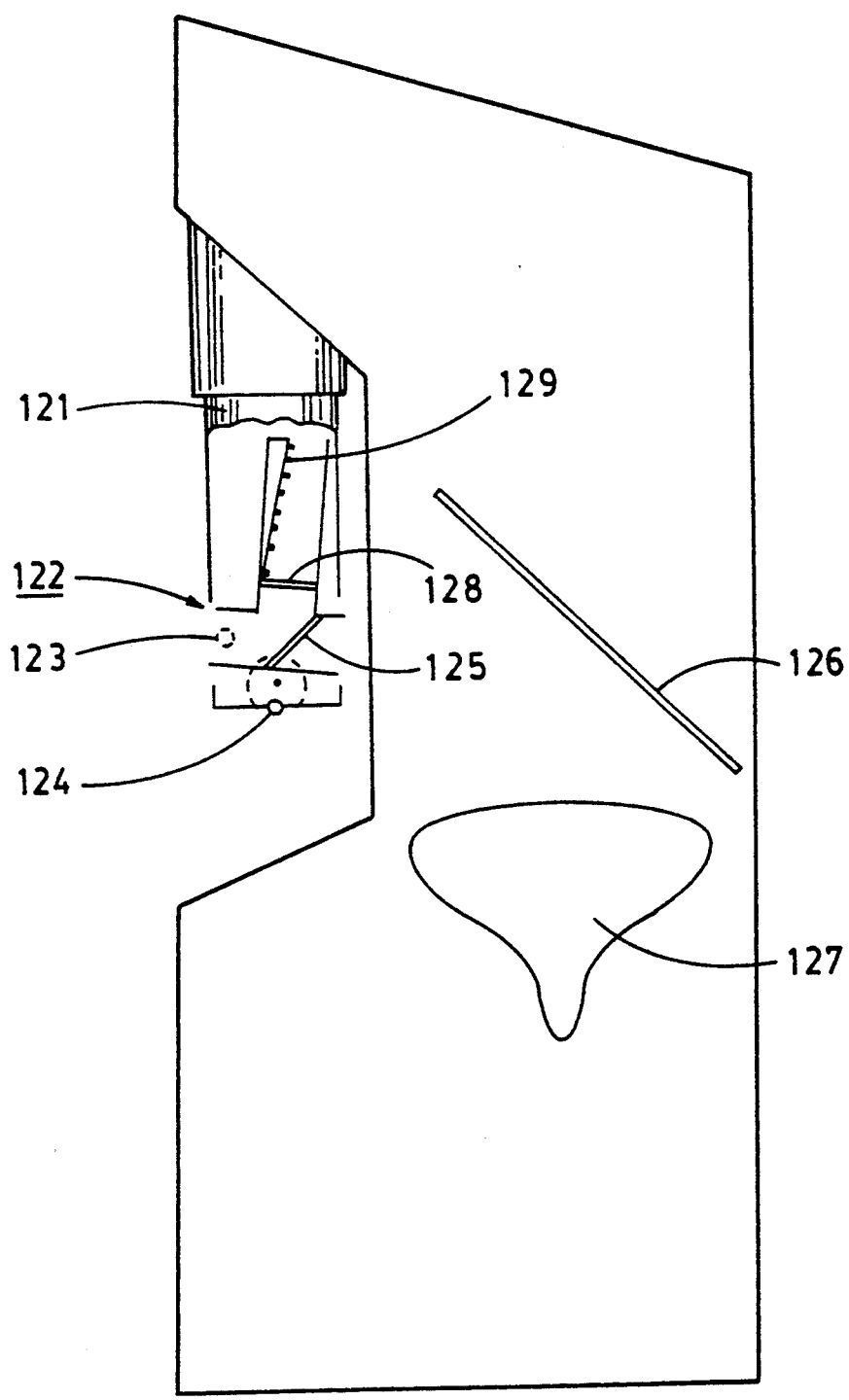
FIG. 10 is a view showing an embodiment of a vertical type TV game machine for the commercial purpose in which the operation unit is the periscope of the submarine.

FIG. 10 is a sectional view of a vertical type TV game machine for a commercial purpose, showing another embodiment. The beam gun of FIG. 8 is, as in a periscope of a submarine, incorporated into an upper cylinder 121. In this case, an optical device 122 of a simulation laser assuming an inverted-T shape is constructed in the following manner. At the lower part in the cylinder 121, a rotary shaft 123 is so set in the cylinder 121 as to be attached to two side faces thereof on the view side. A gear is secured to the rotary shaft 23. A handle 124 laterally fitted to the side face of the cylinder 121 is turned. As a result, the gear of the rotary shaft 123 is rotated with rotations of a gear of the handle shaft secured to the handle shaft through an unillustrated gear train. The optical device 122 can be thereby be tilted to and fro. The cylinder 121 is rotated by shifting the handle 124 right and left.

In the optical device 122, a half-mirror 125 is obliquely fitted to an inverted-T-shaped root portion, whereby it is possible to see a TV monitor 127 reflected by a reflection mirror 126 disposed in an interior of the vertical type TV game machine.

A convex Fresnel lens 128 is located upwardly of the half-mirror 125. A group of light emitting bodies 129 of an LED lamp are so disposed from the convex Fresnel lens 128 towards the focal point thereof as to become gradually dense.

When pushing an unillustrated emission trigger, the group of light emitting bodies 129 are flashed sequentially from the Fresnel lens 128. The flashing light is enlarged by the Fresnel lens 128 and appears as if a laser bullet is shot therefrom. A small-sized TV monitor may be a substitute for the group of light emitting bodies 129.

Figure 11A:
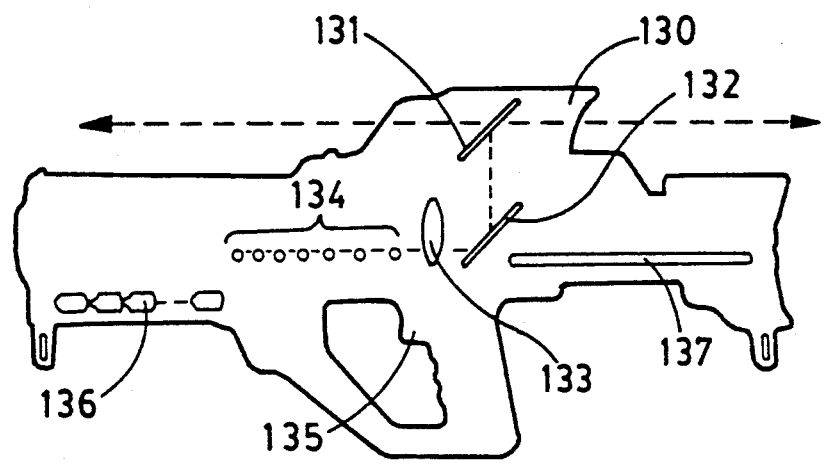
FIG. 11A is a side elevation showing an embodiment in which the present invention is applied to a bazooka laser gun toy.
Figure 11B:
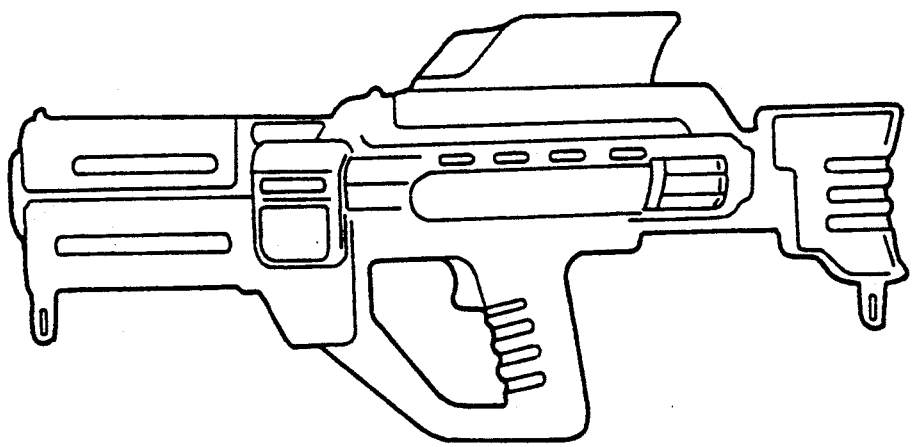
FIG. 11B is a side elevational view of a bazooka laser gun toy housing.
Figure 12:
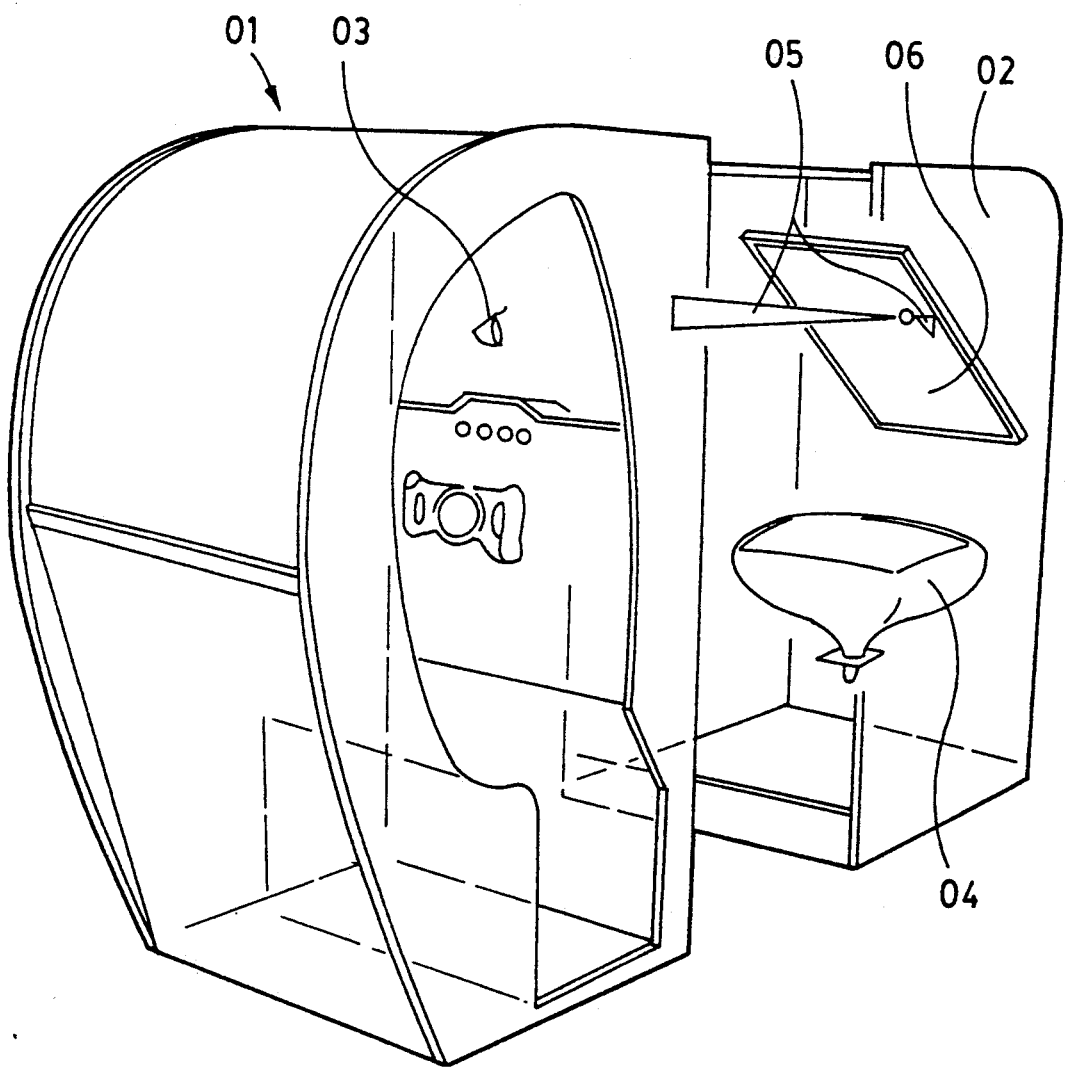
FIG. 12 is a schematic diagram depicting a conventional example.

FIGS. 11A and 11B are side elevation views illustrating a bazooka laser beam gun toy. A scope 130 of the gun barrel incorporates a half-mirror 131 obliquely attached. A reflection mirror 132 is likewise tilted under the half-mirror 131. A convex lens 133 is positioned in front of the reflection mirror 132. A group of light emitting bodies 134 which are independently capable of flashing are disposed in front of the convex lens 133.

The shooter peers into the scope 130 of the gun barrel and aims at the target via the half-mirror 131. When pushing an emission trigger 135, a battery 136 supplies the electricity to an instantaneous lighting/firing sound generating circuit 137. This is a toy which thus emits a simulation laser beam.

Based on the structure of the scope 130, when the shooter pushes the trigger 135 while peering into the scope 130, the light emitting bodies 134 are flashed from this side within the gun barrel. The flashing light is led to the half-mirror 131 in the scope 130 and reflected therefrom. The flashing light appears as if the laser beam is emitted from the gun behind the scene when viewed through the scope 131.

As discussed above, the present invention exhibits the following advantages. The simulation laser optical device of the invention gives such an illusion that the simulation laser beam emitted immediately from the shooter extends a considerable distance, and the beams appear to be flashed sequentially from this side up to the remote position.

The simulation laser beam does not require an actual remote distance. Besides, a far-and-near feeling is given, because the laser beam appears to be darker at a remoter distance. An actual laser beam is not employed, thereby providing the safety simulation of a beam gun.

Although the illustrative embodiments have been described with reference to the accompanying drawings, it is to be understood that the present invention is not limited to those embodiments. Various changes or modifications may be effected therein by one skilled in the art without departing from the scope or spirit of the invention.

What is claimed is:

1. A simulated tracking and firing assembly such as an arcade game machine, comprising:
    means for simulating a tracking system for aiming at a simulated target area, including a housing having an optical viewing axis extending therein towards the target area;
    a first semitransparent mirror positioned in the housing for permitting an operator to view the target area through the semitransparent mirror;
    a first reflecting mirror optically aligned with the first semitransparent mirror to enable the transmission of images to the operator in an overlapping manner with the target area;
    a second semitransparent mirror optically aligned with the second reflecting mirror;
    a second reflecting mirror optically aligned with the second semitransparent mirror;
    a light emitting unit positioned between the second semitransparent mirror and the second reflecting mirror, and
    means for activating the light emitting unit, whereby the observer can view images of the light emitting unit through the first semitransparent mirror as images of the light emitting unit are reflected between the respective second semitransparent mirror and the second reflecting mirror to simulate a projection of images of the light emitting unit towards the target area.

2. The simulated tracking and firing assembly of claim 1 wherein the light emitting unit is positioned in a plane extending between an edge of the second semitransparent mirror and the second reflecting mirror.

3. The simulated tracking and firing assembly of claim 1 wherein the light emitting unit includes a plurality of lights aligned in a linear arrangement.

4. A compact simulated tracking and firing assembly for an arcade game machine having a target area of animated graphics, comprising:
    means for simulating a tracking system for permitting a player to aim at the target area, including a housing defining a field of view of the target area and simulated controls of a firing mechanism;
    means for providing overlapping visual images of a simulated emission from a firing mechanism, including a first and a second half-mirror offset from each other along an optical axis to provide reflections between the first and second half-mirrors, and
    a light emitting body positioned between the half-mirrors in such a position that an observer can view a multiplicity of virtual images of the light emitting body as they are progressively reflected between the half-mirrors to simulate an emission towards the target area.

5. The tracking and firing assembly of claim 4 wherein the means for overlapping includes a third half-mirror within the field of view for reflecting the progressively reflected images of the light emitting body to the player.

6. The tracking and firing assembly of claim 4 wherein the light emitting body is rectilinearly arranged.

7. A compact simulated tracking and firing assembly for an arcade game machine having a target area of animated graphics, comprising:
    means for simulating a tracking system for permitting a player to aim at the target area, including a housing defining a field of view of the target area and simulated controls of a firing mechanism;
    means for providing overlapping visual images of a simulated emission from a firing mechanism, including an inclined reflection mirror, a Fresnel lens, and a plurality of light emitting bodies rectilinearly arranged adjacent the inclined reflection mirror so that a player can view a series of individual images of the light emitting bodies reflected from the inclined reflection mirror and realized by the Fresnel lens to simulate an emission towards the target area.

8. A compact simulated tracking and firing assembly for an arcade game machine having a target area of animated graphics, comprising:
    means for simulating a tracking system for permitting a player to aim at the target area, including a housing defining a field of view of the target area and simulated controls of a firing mechanism;
    means for providing visual images of a simulated emission from a firing mechanism, including:
    a first semitransparent mirror positioned in the housing;
    a second mirror positioned in the housing at a distance offset from the first mirror within the field of view to provide reflections between the first and second mirrors;
    a light emitting unit positioned between the first and second mirrors, and
    means for activating the light emitting unit, whereby the observer can view a multiplicity of virtual images of the light emitting unit through the first semitransparent mirror as the images are reflected between the respective mirrors to simulate an increased distance from the observer considerably beyond any offset distance between the first and second mirrors.

9. The tracking and firing assembly of claim 8 wherein the second mirror is a semitransparent mirror.

10. The tracking and firing assembly of claim 8, further including a third mirror for folding an optical viewing axis from the line of sight of the observer into an axis of the first semitransparent mirror and the second mirror, the third mirror being semitransparent wherein the observer can see the simulated light beam superimposed on his line of sight.

11. The tracking and firing assembly of claim 10, further including a fourth mirror for folding the optical viewing axis, the fourth mirror being a full reflection mirror.

12. The tracking and firing assembly of claim 8 wherein the light emitting unit is positioned in a plane extending between an edge of the first and second mirrors.

13. The tracking and firing assembly of claim 8 wherein the light emitting unit includes a plurality of lights aligned in a linear arrangement.

14. The tracking and firing assembly of claim 8, further including means for providing a field of view of a target area and means for superimposing the images of the light emitting unit within the field of view.

15. A simulated tracking and firing assembly such as an arcade game machine, comprising:
   means for simulating a tracking system for aiming at a simulated target area, including a housing having an optical viewing axis extending therein towards the target area;
   a first semitransparent mirror positioned in the housing for permitting an operator to view the target area through the semitransparent mirror;
   a lens optically positioned to provide an image for reflection off the first semitransparent mirror to an observer;
   a plurality of light emitting members optically positioned to be imaged through the lens; and
   a plurality of light reflecting luminous surfaces that are spaced between the light-emitting members and are positioned progressively closer together the greater the distance from the lens, whereby the images of the light emitting members will be superimposed on the target area.

16. The simulated tracking and firing assembly of claim 15 wherein the lens is a convex lens.

17. The simulated tracking and firing assembly of claim 15 wherein the lens is a Fresnel convex lens.

18. The simulated tracking and firing assembly of claim 15 wherein the light emitting members are rectilinearly arranged.

19. The simulated tracking and firing assembly of claim 15, further including an inclined arrangement of the light emitting members relative to an optical axis of the lens.

20. The simulated tracking and firing assembly of claim 15, further including an inclined reflection mirror for reflecting an image of the light emitting members to the lens.

* * * * *